United States Patent Office 3,486,864
Patented Dec. 30, 1969

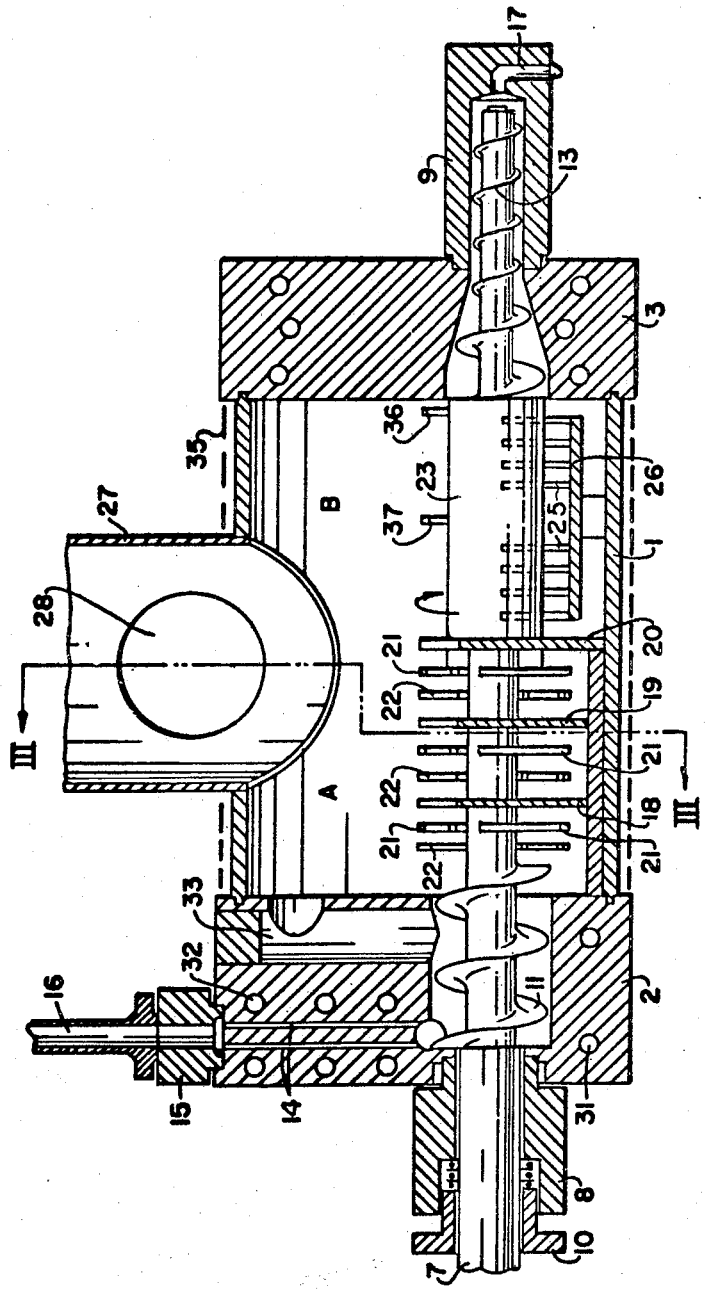

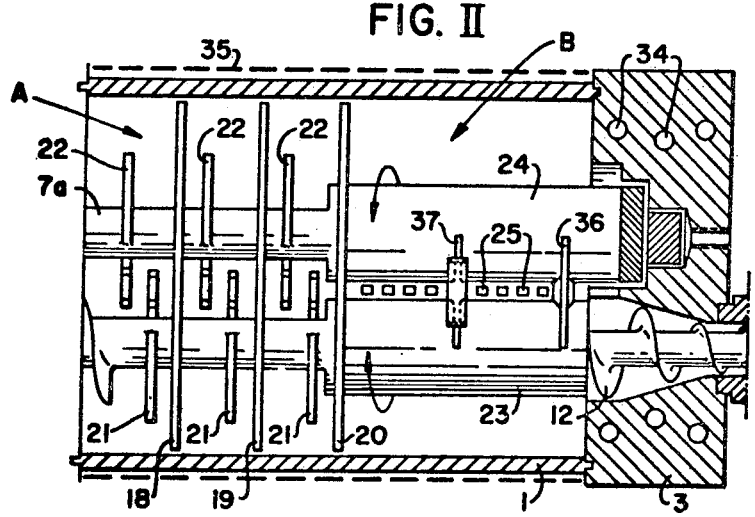
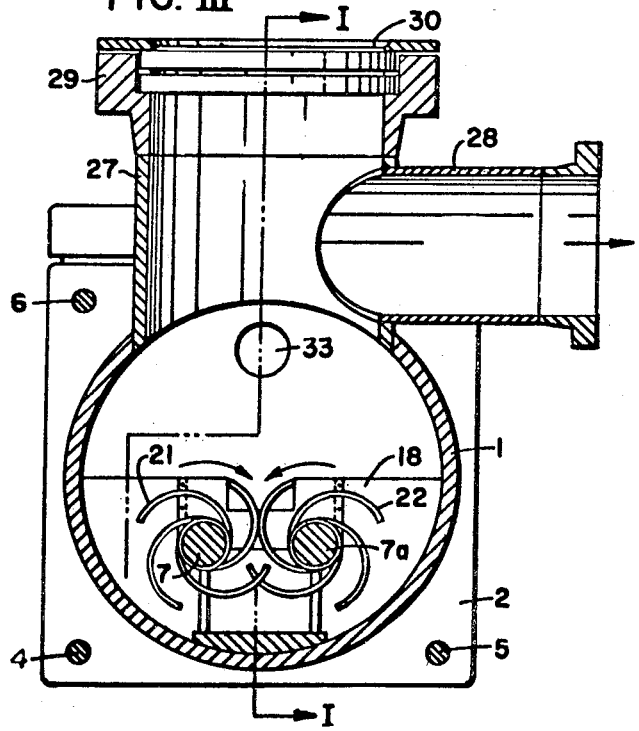

3,486,864
APPARATUS FOR INCREASING THE VISCOSITY AND DEGREE OF POLYMERIZATION OF ETHYLENE TEREPHTHALATE PREPOLYMER
Bernard L. A. van der Schee, Velp, and Bertus H. Zandstra, Arnhem, Netherlands, assignors to American Enka Corporation, Enka, N.C., a corporation of Delaware
Filed May 9, 1966, Ser. No. 548,712
Claims priority, application Netherlands, May 20, 1965, 6506398
Int. Cl. C08f 1/98; B01j
U.S. Cl. 23—285                5 Claims

ABSTRACT OF THE DISCLOSURE

Apparatus for increasing the viscosity and degree of polymerization of ethylene terephthalate prepolymer comprising, in sequential combination: (1) initial heating means for melting solid prepolymer, (2) screw conveying means for conveying the resulting molten prepolymer into a two-zoned horizontal tubular heated housing maintained under vacuum, (3) a pair of supported horizontally disposed and parallel drive shafts adapted to be driven in opposite directions and positioned throughout the length and just above the bottom of said housing, (4) agitator pins mounted and compartmented by transverse partitions on said shafts in the first zone of said housing, said agitator pins intermeshing without contact as said shafts rotate, the upper edge of said partitions being indented to permit polymer overflow through to the second zone containing (5) spaced roller agitation means on said shafts with transverse overflow barriers, and, (6) conveying—means for removing the resulting prepolymer product from said second zone of said housing.

The present invention relates to a process and apparatus for melt spinning filaments, fibers and yarns from highly viscous synthetic polycondensation products. More particularly, this invention envisions a novel method and apparatus for melt spinning higher molecular weight polymers capable of being formed into synthetic filaments, fibers and yarns which have a relative viscosity of at least 2.0. Still more particularly, the invention relates to the production of exceptionally high strength ethylene terephthalate polymer which can be spun into suitable filaments, fibers and yarns which in turn can be made into cords and fabrics and used for reinforcing elastomeric structures.

Synthetic filaments, fibers and yarns made from high viscosity ethylene terephthalate polymer are becoming more prominent among industrial manufacturers and fabricators of pneumatic tires, conveyor belts, V-belts and others primarily because of their exceptionally high strength, wear resistance and stability when subjected to conditions causing high temperatures. However, in order to be suitable for these applications, the content of free carboxyl groups in the polymer products must be low and the degree of polymerization must be substantially uniform. Free carboxyl groups are formed as a result of decomposition reactions occurring during polycondensation which were heretofore promoted by lengthy continual polymerization techniques using known methods and apparatus—with formation being especially pronounced in polymerization techniques wherein polymer chips are melted and further condensed before spinning.

Because of this increase in formation of carboxyl end groups, it has been found very difficult to manufacture filaments, fibers and yarns having both a uniform high degree of polymerization and resistance to thermal degradation particularly when further condensing or increasing the degree of polymerization of prepolymers of ethylene terephthalate.

The present invention envisions manufacture of high performance, terephthalate polymer and fibers, filaments and yarns formed therefrom having a significantly more uniform and higher degree of polymerization and low carboxyl end group concentration, thus making same specially suitable for reinforcing industrial elastomeric products.

Another primary object of this invention is to provide improved polyethylene terephthalate which can be made into filaments, fibers and yarns showing an improved tenacity and retention of higher strength when plied into cords and other fabric structures.

These objects are accomplished by the present invention which contemplates continuously introducing a liquid prepolymer of ethylene terephthalate to a reactor vessel for each spinneret point at a predetermined rate and employing a unique combination of successive heating and continuous agitation up to the time the polymer is extruded.

A "prepolymer" is defined as a lower molecular weight ethylene terephthalate polymer having a degree of polymerization in the range of about 80–130 (which corresponds to a $\eta$ rel. of about 1.5–1.7). The polymer can be formed by known processes such as those disclosed in U.S. Patent No. 2,465,319 wherein an ester interchange between ethylene glycol and dimethyl terephthalate forms bishydroxy-ethyl terephthalate monomer which is polymerized to polyethylene terephthalate under reduced pressure and at elevated temperatures. The resulting polymer is then cut into chips and intensively dried. The novel method and apparatus of this invention envisions further condensing and removal of harmful volatiles from a remelted polymer mass produced by this technique.

$\eta$ rel. refers to the ratio of the viscosity of a solution (1 gram polymer in 100 ml. metacresol solvent) to the viscosity of the solvent, per se, at ambient (around 25° C.) temperature.

Free carboxyl groups refer to the concentration of both the non-ionized acid groups and the ionized groups.

Surprisingly, it has been found that by employing a unique combination of successive heating and continuous agitation for an incremental portion of the prepolymer and for each spinneret point for about 15 minutes and no longer than 20 minutes, a very high, uniform and rapid increase in the degree of polymerization is obtained; hence, the mass is not only effectively gradually increased in molecular weight, but also is prevented from forming a high concentration of free carboxyl groups. While we do not wish to be bound by any particular theory, this is believed to be accomplished by incrementally polycondensing the prepolymer liquid and immediately passing the increased molecular weight material to the spinning point. The polycondensation reaction to which relatively small amount of liquid is subjected becomes very intense and rapid, and the novel process and apparatus of this invention permits a revolving liquid surface to be renewed at a very high rate for evaporation of resulting volatiles, primarily glycol. Continuously rotating agitators serve to divide the prepolymer and constantly present a thin layer thereof to an action of a vacuum for more effective evaporation and removal. As a result, reaction time is considerably reduced and decomposition of the prepolymer is practically negligible.

The process is accomplished by apparatus comprising a vessel with a melting device, a parallel shaft arrangement having a conveyor and mechanical agitating means positioned before and leading to a spinneret. A heat exchanger is provided in the polymer supply line, feeding prepolymer to the parallel shafts and the spinneret. One of the shafts extends through the housing and below the exchanger and comprises a screw conveyor on each end thereof. Between each screw conveyor, an intermediate shaft section is defined and is fitted with novel mixing and agitating elements which are rotated in an enlarged space in a housing and comprises two mixing zones communicating with a source of vacuum. The shafts are spaced so that the portion of the shafts having the novel agitator members will intermesh (when rotated) without touching and a small batch of prepolymer present thereon will be very effectively degassed and subjected to continual polycondensation and transport. The shafts are adapted for rotation in opposite directions.

It should be understood that the novel mixing elements must essentially have a shape according to this invention in order to gradually increase the molecular weight of the polymerizing mass and to insure that the entire batch of the polymer is substantially uniform in molecular weight.

Facilitated by rotation of the shaft and its attached mixers and agitators in a direction opposite each other, the elements constantly pick up prepolymer from the bottom of the space and bring it to the upper surface, thus serving to continuously renew a free surface of the prepolymer for more effective removal of the volatile byproducts resulting from condensation. The volatiles are drawn off as vapors by vacuum means.

To prevent a variance of liquid batch flow through the apparatus, i.e., flow of a portion of the polymer at a higher rate than a second portion, it has been found advantageous to divide the internal space defined by the cylindrical housing and containing the specially configured shaft sections into at least two zones, with the zone wherein the agitator blades intermesh being further divided into chambers. The chambers housing that portion of the shafts which are fitted with the outwardly extending agitator blades are divided by partitions having indented or recessed overflow edges. Hence, each individual batch of the polymer will flow or pass through the apparatus at a constant rate. This precludes any possibility of the final filament, fiber or yarn product showing any significant differences in degree of polymerization.

Since the viscosity of the prepolymer melt is constantly increasing at a very rapid rate, it has been found that the shape of the agitator elements in the first zone (the zone comprising the chambers) should be entirely different from that of the mixing elements in the second zone. The shape of the mixing elements mounted on the parallel shaft is of special configuration and adapted to the viscosity of the liquid on which they are working.

A series of identical elements is provided in the first zone mounted for an intermeshing relationship (as mentioned above) with each pair and, in effect, with the associate partitions, defines a compartment in which an increment of the polymer is momentarily segregated from an increment of lesser molecular weight being introduced to the apparatus by the screw conveyor immediately preceding; or a batch of the polymer momentarily segregated from an increment of higher weight polymer in a compartment thereafter. Each compartment is separated by means of a partition or baffle fixedly mounted to the housing. Thus, the first zone is divided into a series of compartments with each compartment having a pair of mixing elements of the same shape or configuration. The elements are designed in the shape of curved pins and are curved against the direction of rotation of the shafts on which they are mounted. The number of intermeshing agitator pins in each set positioned in each compartment also influences the effectiveness of the apparatus and it is preferred to have a plurality of at least 4 agitators mounted on each of the shafts in the compartment in which they are working.

As briefly mentioned supra, in the second zone the mixing elements must be of different design since the viscosity of the liquid increases to a point whereby it would become too uneconomical to employ the construction developed for the first zone. The mixing elements for the second zone should preferably consist of two parallel rolls mounted on a widened portion of the parallel shafts, preferably equidistant and separated by a narrow slot. Positioned in the slot and extending upwardly between the rolls there is a stationary or movable comb-like member. If movable, the comb-like member should be capable of movement or capable of being traversed in a longitudinal direction. The teeth of the comb member may be straight, curved, round or of "flat face" configuration and may point in any direction. Operation of the mixing device in this zone is essentially in the manner described in U.S. patent application Ser. No. 419,129, filed Dec. 17, 1964, now U.S. Patent No. 3,345,041 commonly assigned herewith.

At the inlet end for the polymer in the vessel the speed of the polycondensation reaction is much higher than at the end comprising the outlet for the polymer; and particularly in the first agitating zone, where the speed of the reaction can cause excessively heavy and undesirable foaming. To prevent excessive foaming, a channel is provided immediately above the first section of the shaft fitted with a screw conveyor since it, in the initial portion of the shaft, immediately comes in contact with the liquid prepolymer. Additionally, use of a channel aids in gas removal. Since the conveyor capacity for the liquid prepolymer is much greater than the amount of prepolymer being supplied, the gas in the liquid begins to immediately volatilize and expand. Thus the channel facilitates immediate removal of these volatiles.

The shaft section positioned in the polymer outlet end of the vessel has a somewhat different configuration. The polymer has in most part been effectively and completely polycondensed and the reaction is practically complete. Accordingly it has been found that the channel capacity for conveyor flight needs to be somewhat smaller than that of the initial section. However, to insure removal of any additional volatiles which might by chance be present, it has been found particularly beneficial to decrease the diameter of the conveyor at the outermost end, i.e., the end immediately adjacent the spinneret. As a result, the liquid is compressed and the volatiles are fed back to the vessel for removal and the attendant voids are closed.

In the heat exchanger, the free polymer should be heated from the melt temperature to that temperature at which the condensation reaction proceeds most favorably. The heating should be done in as short a time as possible so that no decomposition of the liquid takes place. Therefore it is a preferred embodiment that the heat exchanger consist of a heated block to which a number of parallel polymer channels are enclosed. In order that the polymer may be heated sufficiently rapidly, the area of contact of the channel should be at least 100 cm.$^2$/cm.$^3$/sec. the throughput of the gear pump. The channel should have a diameter of less than 5 mm.

Should the cubic content of the apparatus be too large, the residence time of the melt being processed therein would be too long and subject to considerable degree of decomposition. To avoid such problems, the cubic content of the apparatus should be smaller than 2,500 and preferably about 1200 cm.$^3$ per cm.$^3$/sec. of the throughput of the gear pump. In order to insure that the volatiles be properly discharged, there should be a fairly large free space over the surface of the liquid and according to the invention the capacity (cubic content) of the part of the apparatus below the overflow edges of the partitions need only be 30–40% of the total cubic content of the cylindrical tube shaped section housing this portion of the vessel.

The larger the surface area of the liquid being agitated and the more rapidly the polymer surface is renewed, the higher the speed at which the reaction will proceed and this is achieved by increasing the speed at which the mixing elements move to the liquid. However, one practicing this invention should guard against operating at a speed which causes the liquid to be flung from the mixing elements. This will cause polymer to adhere to the inner walls of the enlarged chamber comprising the two diverse mixing zones. The proper speeds can be determined by empirical methods.

The process according to this invention may also be improved by feeding a gas into or mixing a gas with the prepolymer before it is heated and melted. Under the influence of the vacuum, a flow of inert gas, preferably nitrogen, will then be maintained through the polymer mass and act to entrain the volatiles and immediately liberate same from the system.

This invention will be further illustrated by reference to the accompanying drawings in which:

FIGURE 1 shows the apparatus in longitudinal cross-section along lines I—I of FIGURE 3;

FIGURE 2 shows a plan cutaway view of a portion of the apparatus; and

FIGURE 3 is a cross-section along lines III—III of FIGURE 1.

In the various figures like reference characters refer to like parts. In FIGURE 1 reference character 1 refers to a cylindrical or tubular section having the outer ends thereof enclosed in blocks 2 and 3. As best seen from FIGURE 3, this tubular section and blocks 2 and 3 combine to form one unit and are secured by means of a number of bolts (which for the sake of clarity only 4, 5 and 6 are shown). Drive shaft 7 passes through elements 1, 2 and 3 and also the adjoining blocks 8 and 9. Block 8 forms a seal and a thermal transition point for shaft 7 and is also provided with a gland or packing ring member 10 to prevent external polymer leakage. The finished polymer is discharged through block 9 to a spinneret (not shown). Part of the drive shaft 7 located inside block 2 is provided with screw conveyor 11 with flights a shape of which has a pumping capacity about 5 times that required for displacing the liquid being supplied. The shaft portion located inside the block 3 is also provided with screw conveyor 12. The conveyor in this segment of the apparatus has flights the depth of which are smaller. The depth thereof also decreases in a linear direction toward the outlet for the apparatus. The larger flights of the conveyor have approximately three times the capacity of that of discharge conveyor 13 at the end of driving shaft 7.

In the space provided for rotatable screw conveyor 11 there are shown prepolymer melting channels 14 with (for the sake of clarity) only two being shown. Prepolymer is fed to the channels from distributor 15 which in turn is fed from supply line 16. In the supply line, a prepolymer having a degree of polymerization of about 110° C. is fed to the distributors and to the channels. After the prepolymer has been melted, a gear pump feeds it through the supply line through a distributor 15 to channels 14 and to the space provided for screw conveyor 11 and then to the conveyor. In channels 14 the prepolymer is heated from a temperature of about 280° C. to about 320° C. Facilitating heating, block 2 is provided with channels 31 and 32 through which a heating liquid is supplied or in which electrical elements may conveniently be inserted. After the polymer has reached a high degree of polymerization in the vessel, it is pumped through the discharge channel 17 to a conveniently provided spinneret (not shown). In cylindrical tubular housing 1 there are provided three partitions 18, 19 and 20 which reach to about half way the height of this tubular enclosure. FIGURE 3 shows that recesses are provided in the middle of these partitions and serve to channel the viscous liquid overflow. In FIGURES 2 and 3 it will be seen that a second shaft 7a is provided parallel to drive shaft 7 and is adapted for movement in a direction opposite to the first shaft. Shaft 7 can conveniently be driven by a coupling to the shaft by means of gears mounted outside the apparatus and since the gears or driving means compose no part of the instant invention, they are not shown. Partitions 18, 19 and 20 divide tubular housing 1 into compartments containing mixing elements fitted to shafts 7 and 7a. The first of these three compartments comprises the first mixing zone and has mixing elements 21 and 22. The shape of the elements is best seen in FIGURE 3. Between partition 20 and inner part of sidewall 3, resides the zone where mixing elements are constructed as roller surfaces 23 and 24. A narrow slot exists between the roller surfaces into which projects a comb-like member 26 having teeth 25. The teeth of the comb may vary and the comb if desired can be coupled to a mechanism which causes it to traverse in a longitudinal direction.

Specially mounted to cylindrical tube 1 is tubular vapor collecting valve 27 to which is attached a discharge line 28 for the vapor being collected and removed. Valve 27 is provided with a flange 29 to which a sight glass 30 is attached. Sight glass 30 is merely a convenience item and is not necessary for the proper functioning of the apparatus. Blocks 2 and 2 are heated by electrical elements inserted in channels 31, 32 and 34. In block 2 channel 33 is connected to the channel provided for screw conveyor 11. Cylindrical housing 1 may be heated by means of electric heating elements 35. Overflow barriers 36 and 37 are positioned in the space provided between rolls 23 and 24 and contribute to liquid displacement over the roller surface.

Channel 33 serves to discharge the effluent in the initial screw section. The channel serves to prevent excessive foaming throughout the vessel. Partitions 18, 19 and 20 prevent liquid portions having a high degree of polymerization from flowing back and being re-mixed with polymer having a lesser degree of polymerization. Consequently, this prevents the liquid from acquiring a non-uniform degree of polymerization. The uniquely designed pins 21 and 22 on shafts 7 and 7a serve to create maximum surface contact of a thin layer of the highly viscous liquid and the free space above which is under influence of vacuum.

After the liquid has passed the last partition separating zone A from zone B, it passes to rollers 23 and 24. The rollers in combination with teeth 25 cause the liquid to rotate and form high thin ribs on the roller surfaces. This latter operation effects almost complete degassification of the polymer.

When use is made of the above-described apparatus, a highly viscous polyethylene terephthalate is formed and shows a hitherto unknown combination of a high degree of polymerization and a low percentage of free carboxyl groups. The polymer product when shaped into fibrous filaments and yarns is especially adaptable for reinforcing elastomeric articles requiring high strength and retention of strength under severe operating conditions.

In order to provide sufficient tenacity, the filaments prepared from the improved linear terephthalate polyester may be drawn by known techniques at least about 3.5 times their original length. Adhesion between terephthalate polyester products of this invention and the elastomers may be accomplished using known coatings.

Spinneret assemblies which may be used comprise structures as identified in U.S. patent application Ser. No. 517,250, filed Dec. 29, 1965, now U.S. Patent No. 3,353,211 and commonly assigned herewith. Other well-known spinneret assemblies may be used with equal success, however.

The apparatus described has a total capacity of about 3 liters. A total of 1 liter of prepolymer being treated will be in the apparatus during its operation. It is capable of producing 170 gms. of polymer of increased molecular weight per minute of operation. The polymer has a residence time in the apparatus of about 10 minutes. A vacuum of less than 1 mm. of mercury will be maintained in the cylindrical housing portion of the vessel with preferably less than 0.1 mm. of mercury being maintained therein. The relative viscosity of the extruded product will be in the range of 2.0 and 2.7.

What is claimed is:

1. Apparatus for increasing the viscosity and degree of polymerization of ethylene terephthalate prepolymer comprising, in sequential combination: (1) initial heating means for melting solid prepolymer, (2) screw conveying means for conveying the resulting molten prepolymer into a two-zoned horizontal tubular heated housing maintained under vacuum, (3) a pair of supported horizontally disposed and parallel drive shafts adapted to be driven in opposite directions and positioned throughout the length and just above the bottom of said housing, (4) agitator pins mounted and compartmented by transverse partitions on said shafts in the first zone of said housing, said agitator pins intermeshing without contact as said shafts rotate, the upper edge of said partitions being indented to permit polymer overflow through to the second zone containing (5) spaced roller agitation means on said shafts with transverse overflow barriers, and, (6) conveying means for removing the resulting prepolymer product from said second zone of said housing.

2. Apparatus according to claim 1 wherein said agitator pins in the first zone are curved against the rotation of the shafts on which they are fixed.

3. Apparatus according to claim 1 wherein means are provided, prior to introducing molten prepolymer into said housing, for removing volatiles from said molten prepolymer conveyed by said screw conveying means.

4. Apparatus according to claim 1 wherein the conveying means for removing the resulting prepolymer product from the second zone of said housing is mounted in an end block having a channel of decreasing diameter supporting a screw conveyor having a decreasing polymer capacity.

5. Apparatus according to claim 1 wherein said spaced roller agitation means on said shafts have spreading means positioned in the space between said roller agitation means.

References Cited

UNITED STATES PATENTS

| | | | |
|---|---|---|---|
| 2,615,199 | 10/1952 | Fuller | 18—12 |
| 2,964,391 | 12/1960 | Benson | 23—285 |

JAMES H. TAYMAN, JR., Primary Examiner

U.S. Cl. X.R.

18—2, 12; 25—11; 55—52; 159—2; 260—75; 264—102